March 6, 1962     C. L. COHEN ETAL     3,024,458
PULSE PROPAGATION MONITORING SYSTEM
Filed Sept. 29, 1958
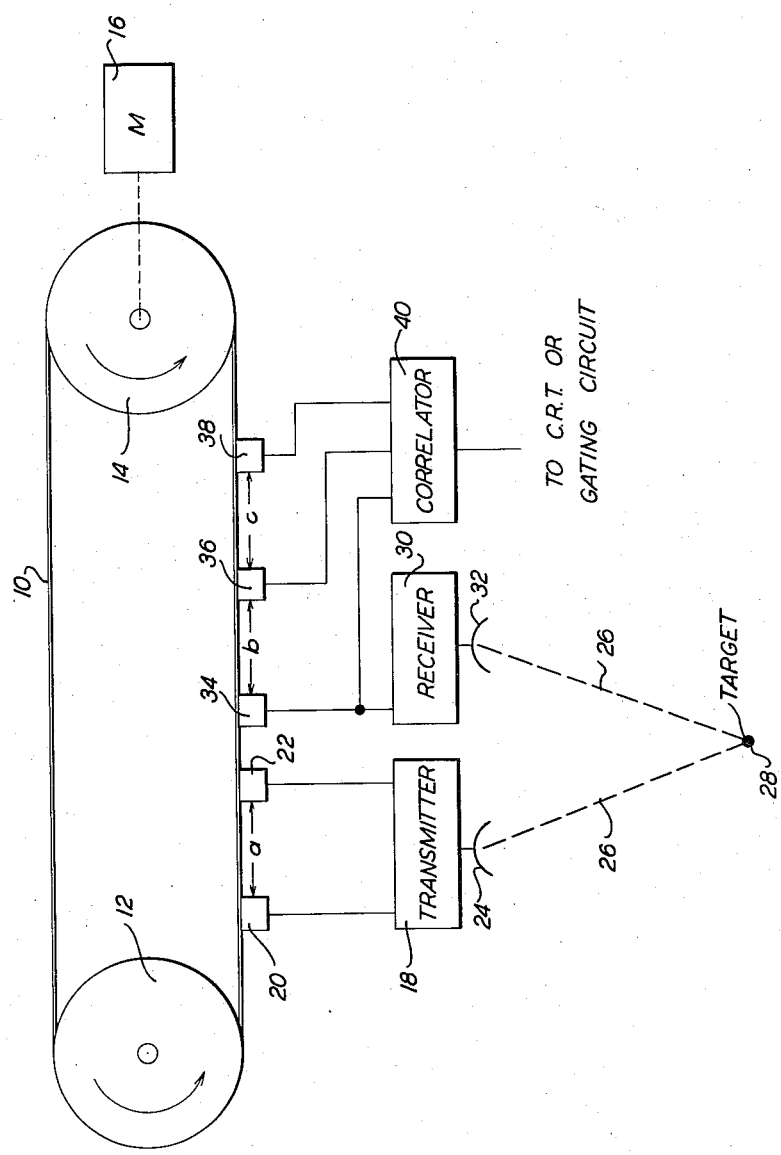
INVENTORS.
CHARLES L. COHEN
JOHN A. FITZPATRICK
EDWIN LYON III
BY
ATTORNEY

United States Patent Office 3,024,458
Patented Mar. 6, 1962

3,024,458
PULSE PROPAGATION MONITORING SYSTEM
Charles L. Cohen, Hyattsville, Md., John A. Fitzpatrick, Washington, D.C., and Edwin Lyon III, Lanham, Md., assignors to ACF Industries, Incorporated, New York, N.Y., a corporation of New Jersey
Filed Sept. 29, 1958, Ser. No. 764,108
10 Claims. (Cl. 343—17.1)

This invention relates generally to radar systems and more particularly to a pulse propagation monitoring system for use with radar, which system controls the pulse frequency of the transmitter and gates a circuit only in response to correlated returned signals.

The common radar method for the detection and determination of remote objects consists of sending out at regularly spaced intervals radio frequency impulses of short duration which are reflected by an object and reradiated as an echo to the point of transmission. The measurement of the time elapsed between transmission and reception will provide the range to the object.

It is well known that this method has a disadvantage in that the presence of different signals from atmospheric noise and man-made electrical noise tend to conceal the useful and desired echoes caused by the presence of the object sought, and detection is somewhat uncertain due to risks of confusion between a noise pulse and a desired echo. It is further known in the art of warfare that hostile radar operators will transmit pulses of a frequency similar to that of the searching radar pulses which jam the desired reflected signal thus making the system useless.

The present invention has for its broad primary object the provision of a pulse propagation system of the type having a transmitter and a monitored receiver wherein the pulse transmission frequency rate is variable.

It is a further and more distinct object to provide, for use in a radar system, a monitoring circuit which selects only pulses transmitted by the system transmitter.

It is a more distinct object of the invention to provide a radar pulse monitoring system using a magnetic medium for a delay line, such medium controlling the pulse frequency rates.

It is a yet further object of the invention to provide a pulse monitoring system for use with a radar circuit wherein a magnetic medium and a series of recording and reproducing heads are provided, and a monitoring circuit, coupled to the reproducing head, is responsive only to the simultaneous reproduction of a series of signals to generate a signal.

The novel features of the invention are set forth with particularity in the appended claims and specification and the invention will be best understood from a consideration of the following description when read in connection with the accompanying drawings, hereby made a part of the specification, in which:

The single figure is a schematic diagram of the preferred embodiment of the invention.

In accordance with one feature of the invention, a system is provided which controls the pulse transmission frequency of a radar transmitter, such control taking the form of a movable magnetic medium. Summarily stated, the invention disclosed herein consists of a first recording head and a first reproducing head spaced therefrom a precisely predetermined distance, the recording head acting to record on a moving magnetic medium, in discrete areas, a signal coincident with the transmission of a pulse of a radar transmitter, such recorded signal being reproduced by the reproducing head and serving to trigger a subsequent pulse from the transmitter whereby a series of pulses are emitted in accordance with the spacing between the heads and the velocity of motion of the magnetic medium. A second recording head and a plurality of reproducing heads are arranged adjacent the magnetic medium in the direction of motion thereof, the second recording head and its associated reproducing heads being spaced the same precisely predetermined distance; the second head acting to record a signal on the magnetic medium coincident with the reception of the transmitted pulses by the receiver after an echo ranging time delay. A circuit is connected to the receiver and to the plurality of reproducing heads which circuit is responsive only to the simultaneous reproduction of a series of recorded pulses together with a later received pulse to generate a monitoring signal. It will be understood that the above-mentioned recording heads each include the usual erasing function whereby any recording on the medium presented to the respective heads is automatically erased before the new recording is done.

Referring now to the drawings, reference character 10 indicates a magnetic medium supported for motion between two drums 12 and 14 and is bent back upon itself to form a continuous loop. A motor 16 is mechanically connected to drive the drums and has associated circuitry (not shown) which permits the control of its speed in any prior art manner. A conventional radar transmitter 18 is connected to a first recording and erasing head 20 disposed adjacent the path of travel of magnetic medium 10, and a reproducing head 22 is spaced a precise predetermined distance, $a$, from head 20. An antenna 24 is provided with the transmitter and the broken lines 26 indicate the path of travel of the radio frequency energy from transmitter antenna 24 to a target designated by reference character 28 and after reflection therefrom to radar receiver 30 having antenna 32. A second recording and erasing head 34 is fixed adjacent the path of travel of the magnetic medium 10 and in the direction of motion thereof from head 20, and a series of reproducing heads 36 and 38 are spaced a distance, inter se, exactly the same predetermined distance selected for spacing, $a$, whereby $a=b=c$. It will be understood that any number of recording heads may be used in the receiving part of this system, two being shown in the interest of conciseness. A correlator circuit 40 which may be an analog multiplication circuit or a power law device of known operating characteristics which for example will derive an output signal only upon the reception of a predetermined magnitude of input voltages, is connected as there shown to the receiver 30 and to reproducing heads 36 and 38. A connection is taken from the correlator circuit 40 which may serve to operate any monitoring circuit, alarm device or recorder or CRT.

The system operation is as follows: Motor 16 is started and the tape or magnetic medium 10 is thereby driven continuously on its rotating drums 12 and 14. The transmitter 18 sends out a first pulse triggered by the operator's pushing a button, to start the system, and coincidentally therewith the transmitter sends a signal to head 20 which records the signal on the tape. The tape carries the recorded signal to the reproducing head 22, and signals from the reproducing head 22, which is connected to transmitter 18, triggers the transmitter so that it sends out another pulse thus starting the cycle over again. The result then is a self-sustaining train or series of pulses spaced in time in accordance with the tape speed and the distance, $a$, between heads 20 and 22. The pulses travel to the target 28 are reflected and after a time delay are received at receiver antenna 32 and are then applied to head 34 which, also, erases the transmission timing pulses coming from head 22. Reproducing heads 36 and 38 are spaced exactly equal to the spacing from heads 20 and 22, so that a reproduced signal from heads 36 and 38 will occur simultaneously with a received pulse at the receiver, which follows because of the exact physical spacing between the heads. Noise impulses are randomly spaced so that while they will be received at the receiver and recorded on the tape, still there is a very small possibility of their occurring simultaneously in time at both heads. The correlator circuit 40 which receives the reproduced signals from heads 36 and 38 simultaneously with a succeeding received pulse from receiver 30 will generate a signal only when there are three simultaneous inputs thereto. This is done by either analog multiplication or applying the sum of the signals to a power-law circuit. A further refinement of the correlator circuit could make it dependent not only upon the timing of the pulses but their respective magnitudes. Thus, when a signal is derived by circuit 40 it will be passed to the receiver's cathode ray tube or to any prior art gating circuit for use or display further in a radar system.

It will be seen that the essence here is the simultaneous arrival of pulses at correlator circuit 40, which coincident arrival follows from the triggering and creation of a precise pulse train by the interaction between heads 20 and 22 and transmitter 18. Since the same magnetic medium is used by both series of heads the system cannot depart from synchronization and is independent of the speed of the medium. Recording head 20 as previously mentioned has an included erasing action and when the signals recorded by head 34, in response to the reception of re-radiated pulses, travel around the loop and are presented to head 20 they are automatically erased and a new transmission timing signal train is recorded to start a fresh cycle. If the velocity of motion of the medium is maintained constant the timing signal train will, of course, remain constant, but if the velocity is changed, then a new pulse transmission timing is obtained. The receiver portion of the system will respond as before despite the change in velocity because of the exact spacing of the heads. It follows from the above, that the system is very useful in avoiding the jamming pulses introduced by an enemy. If, for example, the enemy were able to detect the transmission timing used in this system and proceeded to transmit his own jamming signals on the same pulse frequency, then a simple change in the r.p.m. of motor 16 will change the velocity of medium 10 with the result that an entirely different pulse transmission timing is obtained at transmitter 18 and since the correlator circuit 40 will respond only to the simultaneous reception of the reproduced signals from heads 36 and 38 together with a pulse from the receiver, then the jamming pulses will be rejected.

The spacing between heads 22 and 34 is not material since head 34 erases all recordings presented to it.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. A pulse propagation monitoring system having a pulse echo radar transmitter and receiver comprising in combination a magnetic medium supported for motion adjacent a series of recording and reproducing heads, a first recording head connected to the transmitter to record a signal simultaneously with the transmission of a pulse, a first reproducing head connected to the transmitter and disposed a predetermined distance from the said first recording head in the direction of motion of said medium to trigger the transmission of a succeeding pulse, a second recording head and a plurality of reproducing heads each respective head being spaced the said predetermined distance, said second recording head connected to the receiver to record successive echo pulses received after an echo ranging cycle time delay, the said reproducing heads acting to simultaneously reproduce respective successive pulses coincident with the reception of a later echo pulse, and a correlator circuit connected to the receiver and the said reproducing heads and responsive only to the simultaneous reception of at least three pulses to generate a monitoring signal.

2. The invention as set forth in claim 1 wherein the said second recording head includes means to erase the previously recorded signals.

3. The invention as set forth in claim 2 including means to vary the velocity of motion of the said medium.

4. A pulse propagation control system having a pulse echo radar transmitter and receiver comprising in combination a magnetic medium, means to drive said medium and including means to vary the velocity of motion thereof, a series of recording and reproducing heads fixed adjacent the path of travel of said medium, a first recording head coupled to the transmitter to record a signal simultaneously with the transmission of a pulse, a first reproducing head spaced from the first recording head a predetermined distance in the direction of medium motion and connected to the transmitter to trigger the transmission of a succeeding pulse whereby to produce a series of regularly recurring pulses from the transmitter having a frequency proportional to the velocity of the medium, a second recording head and a plurality of reproducing heads each being spaced the said predetermined distance, said second recording head connected to the receiver to record successive signals representing successive echo pulses after an echo ranging cycle time delay, the reproducing heads acting to simultaneously reproduce successive signals coincident with the reception of a later echo pulse, means connected to the receiver and to the plurality of reproducing heads and responsive only to the coincident occurrence of a received echo pulse with the reproduced signals to generate a monitoring signal to thereby eliminate the interference of random noise input energy to the receiver.

5. The invention as set forth in claim 4 including means to erase the first recorded signals.

6. The invention as set forth in claim 5 including means to erase the second recorded signals.

7. The invention as set forth in claim 4 wherein the said medium comprises a magnetic strand formed into a loop.

8. A pulse propogation monitoring system having a pulse echo radar transmitter and receiver comprising in combination means to record a signal simultaneously with the transmission of a pulse, means responsive to the recorded signal to trigger the transmission of another pulse after a predetermined time interval to thereby produce a continuous series of pulses from the transmitter, means to record successive echo pulses from the receiver after an echo ranging time delay, means to reproduce at least two of the recorded successive echo pulses, and means connected to the receiver and to the last named means to generate a monitoring signal in response to the simultaneous occurrence of said recorded successive pulses and the reception of a succeeding echo pulse.

9. A pulse monitoring system having a pulse generator and pulse receiver comprising in combination means to record a signal simultaneously with the generation of a pulse means responsive to the recorded signal to trigger the generation of another pulse to thereby produce a continuous series of pulses, said generated pulses being received by said receiver after an echo ranging cycle time delay, means to record successive delayed received pulses, means for reproducing at least two of said recorded received pulses and means connected to said receiver and said means for reproducing to generate a signal responsive to the simultaneous occurrence of said recorded successive delayed received pulses and the reception of a delayed unrecorded received pulse.

10. A system for use with a radar circuit having a transmitter and receiver comprising a magnetic medium, means to drive the medium at varying speeds, a series of recording and receiving heads fixed adjacent the medium to record signals on discrete magnetic areas thereof and to reproduce the same, a first recording head connected to the transmitter, a first reproducing head spaced from the first recording head a predetermined distance and connected to the transmitter to trigger a succeeding pulse whereby the transmitter pulse frequency is a function of the said predetermined distance and the velocity of the medium, a second recording head and a plurality of reproducing heads mutually spaced the said predetermined distance, said second recording head connected to the receiver to record successive echo signals representing successive echo pulses after an echo ranging time delay, said plurality of reproducing heads acting to simultaneously reproduce successive recorded echo signals coincident with the reception of a successive echo pulse, and a circuit connected to the receiver and the said reproducing heads and responsive only to the coincident reception of the successive pulse with the reproduced signals to derive a signal.

References Cited in the file of this patent
UNITED STATES PATENTS

| | | |
|---|---|---|
| 2,410,424 | Brown | Nov. 5, 1946 |
| 2,566,189 | Gloess | Aug. 28, 1951 |
| 2,804,499 | Butts | Aug. 27, 1957 |
| 2,836,359 | Mazzagatti | May 27, 1958 |
| 2,933,724 | Ashby | Apr. 19, 1960 |